(12) United States Patent
Phillips et al.

(10) Patent No.: US 6,375,864 B1
(45) Date of Patent: Apr. 23, 2002

(54) DAYLIGHT/NIGHTGLOW COLORED PHOSPHORESCENT PLASTIC COMPOSITIONS AND ARTICLES

(75) Inventors: Tracy L. Phillips, Lawrenceville; Jerry Alan Bodi, Suwanee, both of GA (US)

(73) Assignee: M.A. HannaColor, a division of M.A. Hanna Company, Suwanee, GA (US)

( * ) Notice: Subject to any disclaimer, the term of this patent is extended or adjusted under 35 U.S.C. 154(b) by 0 days.

(21) Appl. No.: 09/189,464

(22) Filed: Nov. 10, 1998

(51) Int. Cl.$^7$ .............................................. C09K 11/08
(52) U.S. Cl. .................. 252/301.33; 524/408; 524/433; 524/437; 524/439; 252/301.35
(58) Field of Search .................. 428/690; 524/408, 524/433, 437, 439; 252/301.16, 301.35, 301.36, 301.33

(56) References Cited

U.S. PATENT DOCUMENTS

| | | | |
|---|---|---|---|
| 3,832,556 A | 8/1974 | Schroeder | 250/462 |
| 3,879,611 A | 4/1975 | Schroeder | 250/462 |
| 3,978,340 A | 8/1976 | Schroeder | 250/462 |
| 4,035,652 A | 7/1977 | Schroeder | 250/462 |
| 4,070,763 A | 1/1978 | Carts, Jr. | 33/241 |
| 4,211,813 A * | 7/1980 | Gravisse et al. | 428/263 |
| 4,309,374 A | 1/1982 | Pollard | 264/115 |
| 4,374,749 A | 2/1983 | Cusano et al. | 252/301.36 |
| 4,414,974 A | 11/1983 | Dotson et al. | 128/305 |
| 4,444,714 A | 4/1984 | Martenson | 264/328.18 |
| 4,534,961 A | 8/1985 | Liff | 424/63 |
| 4,623,579 A | 11/1986 | Quon | 428/215 |
| 4,629,583 A | 12/1986 | Goguen | 252/301.35 |
| 4,640,797 A | 2/1987 | Goguen | 252/301.36 |
| 4,707,297 A * | 11/1987 | Paske, Jr. et al. | 252/301.16 |
| 4,708,817 A * | 11/1987 | Dudnick | 252/301.16 |
| 4,725,316 A | 2/1988 | Mahany, II | 106/288 |
| 4,862,613 A | 9/1989 | Eyngorn | 40/346 |
| 4,911,830 A * | 3/1990 | Bromley et al. | 252/301.16 |
| 4,914,554 A | 4/1990 | Sowers | 362/100 |
| 4,928,212 A | 5/1990 | Benavides | 362/61 |
| 5,007,647 A | 4/1991 | Gulick | 273/213 |
| 5,053,930 A | 10/1991 | Benavides | 362/80 |
| 5,073,843 A | 12/1991 | Magee | 362/84 |
| 5,135,591 A | 8/1992 | Vockel, Jr. et al. | 156/67 |
| 5,172,937 A | 12/1992 | Sachetti | 283/81 |
| 5,217,763 A | 6/1993 | Boury | 428/11 |
| 5,220,166 A | 6/1993 | Takeuchi et al. | 250/271 |
| 5,223,330 A | 6/1993 | Vockel, Jr. et al. | 428/204 |
| 5,276,075 A | 1/1994 | Santini | 524/40 |
| 5,330,195 A | 7/1994 | Gulick | 273/213 |
| 5,347,014 A * | 9/1994 | Babler | 548/453 |
| 5,424,006 A | 6/1995 | Murayama et al. | 252/301.4 |
| 5,427,708 A | 6/1995 | Stark | 252/108 |
| 5,440,458 A | 8/1995 | Volk | 362/84 |
| 5,498,280 A | 3/1996 | Fistner et al. | 106/19 B |
| 5,548,493 A | 8/1996 | Young | 362/84 |
| 5,588,736 A | 12/1996 | Shea, Sr. | 362/106 |
| 5,605,734 A | 2/1997 | Yeh | 428/97 |
| 5,607,993 A | 3/1997 | Christy | 524/237 |
| 5,645,663 A | 7/1997 | Nakayama et al. | 156/67 |
| 5,665,793 A | 9/1997 | Anders | 523/172 |
| 5,686,022 A | 11/1997 | Murayama et al. | 252/351.4 R |
| 5,695,696 A | 12/1997 | Hensler et al. | 264/21 |
| 5,714,012 A | 2/1998 | Murata et al. | 136/247 |
| 5,714,255 A | 2/1998 | Yeh | 428/364 |
| 5,752,761 A | 5/1998 | Pietruczynik et al. | 362/84 |
| 5,755,045 A | 5/1998 | Mashita et al. | 36/84 |
| 5,839,718 A * | 11/1998 | Hase et al. | 252/301.4 F |
| 5,976,411 A * | 11/1999 | Feng et al. | 252/301.35 |
| 6,118,096 A * | 9/2000 | Feng et al. | 219/121.69 |
| 6,168,853 B1 * | 1/2001 | Feng et al. | 428/207 |

FOREIGN PATENT DOCUMENTS

| | | |
|---|---|---|
| EP | 0 339 895 | 11/1989 |
| EP | 0 721 007 | 7/1996 |
| GB | 1 561 530 | 2/1980 |

OTHER PUBLICATIONS

Hirotec, Inc., Santa Ana, CA. Product Information, revised May 1, 1998, pp. 1–5 (Permaglow) and pp. 1–4.
Ferro Corporation, Cleveland, OH. Product Information. Lumi.Photoluminescent Pigment, 2 pages.
Capricorn Chemicals, Cambridgeshire, England. Product Guide. Glowbug Luminescent Colours, pp. 1–53.

* cited by examiner

*Primary Examiner*—Janet Baxter
*Assistant Examiner*—Barbara Gilmore
(74) *Attorney, Agent, or Firm*—Jones, Day, Reavis & Pogue

(57) ABSTRACT

The invention provides compositions and molded, extruded or formed phosphorescent plastic articles produced therefrom that contain non-radioactive, non-sulfide phosphorescent phosphor pigments that emit light in the visible spectrum, preferably metal oxide aluminate:europium-activated phosphorescent phosphor pigments, preferably in combination with polymer-soluble daylight fluorescent dyes, in transparent or translucent resins. The plastic articles produced from the compositions of the invention exhibit a remarkably rich, attractive, clear, brilliant fluorescent daylight color and a strong, long-lasting glow-in-the-dark luminescence having a color similar to that of the daylight color.

23 Claims, No Drawings

DAYLIGHT/NIGHTGLOW COLORED PHOSPHORESCENT PLASTIC COMPOSITIONS AND ARTICLES

BACKGROUND OF THE INVENTION

The invention relates to phosphorescent plastic compositions and articles that have an attractive bright fluorescent daylight color and a strong glow-in-the-dark phosphorescence of a color similar to that of the daylight color. In particular, the invention relates to the direct use of polymer-soluble fluorescent dyes, in combination with phosphorescent pigments, to provide an expanded and customizable palette of daylight and glow-in-the-dark colors.

The use of phosphorescent materials in the production of luminescent materials is very well known, having been used for such diverse "glow-in-the-dark" items as golf balls, rubber shoe soles, many varieties of toys, safety helmets, safety tape for bicycle visibility, directional indicators and signs, backlight for liquid crystal clocks, and the like. Phosphorescent materials have been reported for use as nighttime illumination for vehicle parts, such as wheel valve stem caps, gear shift knobs, or for phosphorescent tabs for illuminating keyholes. They have also been used for nighttime illumination of plastic electronic key pads that contain informational indicia.

Phosphorescent phosphors are substances that emit light after having absorbed visible or ultraviolet radiation or the like, and the afterglow of the light that can be visually observed continues for a considerable time, ranging from several minutes to several hours after the source of the stimulus is cut off. Until recently, the most commonly known non-radioactive phosphorescent phosphor pigments were sulfides of zinc, calcium, strontium and cadmium, such as CaS:Bi (which emits violet blue light), CaSrS:Bi (which emits blue light), ZnCdS:Cu (which emits yellow or orange light) and ZnS:Cu (which emits green light). The color palette of the phosphorescent afterglow, however, has been limited to these colors.

The daylight appearance of plastic articles containing sulfide-based phosphorescent phosphor pigments is an aesthetically unappealing pale greenish or grayish white. Therefore, daylight color pigments are often added to plastic compounds containing these phosphorescent phosphor pigments. However, the added color pigments, by virtue of their particle size (e.g., about one to six microns), interfere with both the absorption of light and the emission of light by the phosphorescent phosphors, resulting in a diminished luminescence and shortening of the afterglow duration.

To attempt to overcome the interfering effects of the color pigments, it is necessary to employ large quantities of the relatively expensive phosphorescent pigments (e.g., 20% to 30% by weight) in plastic compositions containing daylight color pigments. Therefore, it has not heretofore been economical for suppliers of color concentrates to prepare plastic phosphorescent/daylight color concentrate compositions for use by end users in the manufacture of plastic articles. Another disadvantage of the sulfide-based phosphorescent phosphors is that they are sensitive to ultraviolet light, such as that of sunlight or moonlight, and thus are not weatherable. Therefore their use has, for the most part, been restricted to indoor applications.

Recently, a new group of phosphorescent phosphors that both absorb and emit light in the visible spectrum has become available. (See, for example, U.S. Pat. Nos. 5,424,006 and 5,686,022). These phosphors have a crystalline structure and are highly chemically stable metal oxide aluminates, containing one or more of strontium, calcium, magnesium, and barium, activated by europium and at least one co-activator, such as ytterbium, dysprosium, neodymium, samarium, thorium, thulium, erbium, and the like, to form a phosphorescent phosphor, such as $SrAl_2O_4$; Eu, Dy, which emits green light (about 520 nm), $CaAl_2O_4$:Eu, Nd or Sm, which emits blue light (about 442 nm), $SrO.5CaO.5Al_2O_4$:Eu, Dy, which emits blue-green light (about 490 nm), and $BaAl_2O_4$:Eu, Nd, which emits green light (about 500 nm). These new phosphors are weatherable, ie. they do not readily decompose upon exposure to ultraviolet light, such as sunlight or moonlight, and they can be used outdoors as well as indoors. The new phosphors have an afterglow that is about three to more than twelve times brighter than that of the comparable sulfide phosphorescent phosphors at 10 minutes after stimulation, and about 17 to more than 37 times brighter at 100 minutes after stimulation; moreover, the afterglow of these phosphors is still visible 15 to 24 hours or more after a single stimulation. Depending on the chemical nature of the phosphor selected, however, the color of the afterglow is limited to green, blue-green, or violet, and the daytime appearance of plastics containing these phosphors is also an aesthetically unappealing pale greenish white or grayish white.

In view of the foregoing advantages of the metal oxide aluminate, europium-activated phosphorescent phosphors, it would be desirable to provide an aesthetically pleasing daylight color to plastic articles containing these phosphorescent pigments without diminishing either the brightness or the duration of the afterglow. The following description sets forth unexpected results obtained when daylight fluorescent color dyes, rather than daylight color pigments, were added to resin compositions containing the metal oxide aluminate-based phosphorescent phosphors.

SUMMARY OF THE INVENTION

The invention provides compositions, and molded, extruded or formed phosphorescent plastic articles produced therefrom, that contain non-radioactive, non-sulfide phosphorescent phosphor pigments that emit light in the visible spectrum, preferably metal oxide aluminate:europium-activated phosphorescent phosphor pigments, in combination with polymer-soluble daylight color dyes, preferably daylight fluorescent dyes, in transparent or translucent resins.

The plastic articles produced from the compositions of the invention exhibit a remarkably rich, attractive, clear (preferably almost transparent), brilliant daylight appearance, especially a brilliant fluorescent daylight appearance, in addition to a strong, brightly colored, long-lasting luminescent afterglow in the dark. It has been discovered herein that by using dyes, especially fluorescent dyes, rather than color (or fluorescent) pigments, to provide daytime color to the plastic articles, the brightness and duration of the afterglow of the phosphorescent phosphor pigments is not diminished. Moreover, it has been discovered herein that by employing fluorescent dyes rather than fluorescent pigments, and by employing transparent or translucent resins, the phosphorescent glow of the preferred metal oxide aluminate:europium-activated pigments in transparent or translucent plastics is so strong that it illuminates the plastic article such that the color of the glow-in-the-dark luminescence appears to take on a color that is very similar to that of the daylight fluorescent dye. The "acquired" glow-in-the-dark color may be entirely different than the color of the natural luminescence of the phosphorescent phosphor. For example, an article having a clear fluorescent pinkish red daylight color has a clear bright pink glow-in-the-dark luminescence, even when the natural luminescence of the phosphorescent phosphor is bright green. Similarly, an article having a clear fluorescent orange daylight color has a clear bright orange glow-in-the-dark luminescence, when the natural luminescence of the phosphor is bright green.

Further, by varying the concentration of the daylight fluorescent dyes, and/or by mixing together two or more daylight fluorescent dyes, and/or by mixing daylight fluorescent dye(s) with conventional dye(s), the invention provides bright and strong, new and unique glow-in-the-dark hues in a palette of colors and shades that were not previously available (e.g., red, pink, orange, yellow, white, reddish violet, yellow-green, and the like). Thus, the invention compositions may be customized to create a variety of daylight, preferably fluorescent, and glow-in-the-dark colors, including pastels.

An advantage of the compositions of the invention is the use of polymer-soluble color dyestuffs which dissolve in the plastics melt at the required processing temperature of thermoplastic resins and are present as a true physical solution in the resin. Thus, when transparent resins are employed, the resulting phosphorescent colored plastic articles containing the dyes are clear (almost transparent), except for a slight translucency imparted by the phosphorescent phosphor pigment particles. The preferred use of both transparent resins and transparent dyes allows virtually the maximum amount of light absorption and light emission by the phosphorescent phosphors in the plastic article. Thus, the phosphorescent plastic article colored by a polymer-soluble daylight fluorescent dye exhibits a much stronger luminescence in the dark than is possible by the use of daylight color pigments (including fluorescent pigments), the particles of which impede the absorption and emission of light by the phosphorescent pigments. As a result, it is possible to use very small amounts of these expensive phosphorescent pigments (e.g. 1% to 15% by weight) in the final part composition. Moreover, when daylight fluorescent dyes are employed that have a very high tinctorial strength, it is also possible to use very small amounts of very pure, but expensive, dyes (e.g, 0.005% to 0.01% by weight) in the final part composition. Thus, economical and cost-effective colored phosphorescent plastic compositions can now be produced from materials that may otherwise be exorbitantly expensive. Moreover, the requirement for very small amounts of the phosphor pigments and the high tinctorial strength daylight fluorescent dyes means that daylight colored phosphorescent concentrate compounds may now be economically produced for use by end user manufacturers of plastic articles. In contrast to previous concentrate compounds employing color pigments, the fluorescent dyes present in concentrate compounds made from the compositions of the invention are freely soluble in end user-compatible resins. Therefore, they do not interfere with the luminosity or the duration of the phosphorescent afterglow and allow production of plastic articles having a clear, rich, brilliant daylight color and a bright, long-lasting afterglow.

When daylight fluorescent dyes that are weatherable (i.e., resistant to moisture and UV light) are employed in the invention compositions, daylight fluorescent/brightly colored glow-in-the-dark plastic articles may be produced for outdoor use, such as for playground equipment, golf balls, signs, and the like.

In one embodiment, the invention provides a composition suitable for molding, extruding or forming a phosphorescent plastic article having a daylight color and a similarly colored phosphorescent glow in the dark, comprising (1) 1% to 15% by weight of a non-radioactive, non-sulfide phosphorescent phosphor pigment that emits a light in the visible spectrum; (b) 0.001% to 1% by weight of at least one polymer-soluble daylight fluorescent dye; and (c) 85% to 99% by weight of a transparent or translucent resin. Preferably, the resin is a dye-compatible resin. As used herein, the term "compatible resin" refers to a resin that does not allow substantial "bleeding", "migrating" or "blooming" of the polymer-soluble dye out of the plastic article. Such resins are preferred because they allow the plastic articles to be used for consumer articles, such as toys, foodstuff packaging, and the like. The compatible resin may be thermoplastic or thermosetting, but is preferably a "glass clear" transparent resin.

The composition preferably contains 5% to 12% by weight of the phosphorescent pigment and, more preferably, about 10% by weight of the pigment. The composition preferably contains 0.005% to 0.5%, preferably 0.005% to 0.05%, especially 0.005% to 0.01% by weight of the polymer-soluble dye. In order to disperse very small amounts of dye throughout the resin composition, it is preferable to dissolve the dye (which is typically in powder form) in a small amount of a dispersing agent (e.g., 0.01% to 1% by weight), such as a viscous oil, prior to mixing with the resin composition. It is also preferable to employ small amounts of a lubricating agent in the resin composition (e.g., 1% to 10% by weight) to aid in dispersing of the phosphorescent pigment and other ingredients. The composition may further include 0.001% to 2% of a whitening agent, such as zinc sulfide, and/or 0.001% to 20% of an inert filler, such as calcium carbonate, talc, china clay, mixtures of these, and the like.

The colored phosphorescent compositions of the invention may be used to prepare brightly colored fluorescent, attractive, plastic articles with a long-lasting, high-luminance color-customized afterglow. Such articles include, but are not limited to, golf balls and other sporting goods, outdoor playground equipment, toys, novelties, various gauges such as electrical gauges, dial plates of clocks, backlights for liquid crystals, safety signs, outdoor and interior indicators and illuminators for vehicles, such as automobiles, airplanes, ships, bicycles, and the like, signs, such as traffic signs, guard rail indicators, buoys, safety tapes, and the like.

DETAILED DESCRIPTION OF THE INVENTION

The invention provides phosphorescent compositions and molded, extruded or formed plastic articles manufactured therefrom, that have a rich, bright, attractive fluorescent daylight color, in addition to a strong similarly colored luminescent afterglow in the dark. In one embodiment, the composition consists of (a) 1% to 15% by weight of a non-radioactive, non-sulfide phosphorescent phosphor pigment that emits light in the visible spectrum; (b) 0.001% to 1% by weight of at least one polymer-soluble daylight fluorescent dye; and (c) 85% to 99% by weight of a transparent or translucent resin.

Phosphorescent phosphors suitable for use in the compositions and molded, extruded or formed plastic articles of the invention have a brighter luminescence and longer afterglow duration than provided by conventional sulfide phosphors. Suitable phosphorescent phosphors are described in U.S. Pat. Nos. 5,424,006 and 5,686,022, the disclosures of which are hereby incorporated by reference. These described phosphorescent phosphor pigments, which absorb visible or ultraviolet light and emit light in the visible spectrum, are manufactured by Nemoto & Company, Tokyo and are obtainable from United Mineral & Chemical Corporation, Lyndhurst, N.J. under the brand name LumiNova®. These phosphors are chemically stable metal oxide aluminates having the general formula $MAl_2O_4$, where M is one or more metals selected from strontium (Sr), calcium (Ca), barium (Ba), and magnesium (Mg), activated by europium (Eu) and at least one co-activator, selected from lanthanum (La), cerium (Ce), praseodymium (Pr), neodymium (Nd), samarium (Sm), gadolinium (Gd), dysprosium (Dy), holmium (Ho), erbium (Er), terbium (Tb), thulium (Tm), ytterbium (Yb), lutetium (Lu), tin (Sn), manganese (Mn) and bismuth (Bi).

The chemical compositions of exemplary phosphors suitable for use in the invention include, but are not limited to $SrAl_2O_4$:Eu, Dy and $SrAl_2O_4$:Eu, Nd that emit high luminance green light (about 520 nm); $CaAl_2O_4$:Eu, Nd; $CaAl_2O_4$:Eu, Sm; and $CaAl_2O_4$:Eu, Tm that emit super high luminance blue light (about 442 nm); $BaAl_2O_4$:Eu, Nd and $BaAl_2O_4$:Eu, Sm, that emit green light (about 500 nm); and a compound $SrXCa_{1-x}Al_2O_4$:Eu plus a co-activator, such as $SrO.5CaO.Al_2O_4$:Eu, Dy, that emits blue-green light.

LumiNova® Green phosphorescent phosphor pigments demonstrate an afterglow duration, after excitation with a standard light source at 400 lux for 20 minutes at room temperature, of about 1500 minutes to 2500 minutes (25 to 42 hours) or, after excitation with a standard light source at 200 lux for 4 minutes, of about 700 minutes to 1000 minutes (12 to 17 hours). Exemplary of such pigments is Lumi-Nova® Green (G-300 M) comprising $SrAl_2O_4$:Eu, Dy, which has a specific gravity of about 3.6, a particle size of 20±5 $\mu$m to greater than 100 $\mu$m and absorbs light in the ultraviolet spectrum (about 320 to about 382 nm). This pigment emits green light at a peak wave length of about 521 nm with an afterglow duration of greater than 2000 minutes (33 hours) after excitation with a standard light source at 400 lux for 20 minutes at room temperature.

Other suitable phosphorescent phosphor pigments for use in the invention are manufactured by Chemitech, Inc., Tokyo and available from F. W. Bass International, Inc., Moon Township, PA under the brand name Picariko. For example, Picariko CP-05 (which emits green light) and CP-10 (which emits blue light) are phosphorescent phosphor pigments manufactured from a mixture of aluminum oxide, strontium oxide, calcium oxide, europium oxide, and boron oxide. This phosphor pigment has a crystalline (triclinic) structure and has a melting point of greater than 1500° C., a particle size that passes through 200 mesh and a specific gravity of about 3.6. It is a yellowish green powder that absorbs light in the ultraviolet spectrum (200–450 nm) and emits a green light having an emission peak of 520 nm with an afterglow duration of greater than 20 hours.

The selected concentration of the phosphorescent phosphor pigment in the polymeric composition depends upon the degree of luminescence and duration of afterglow desired. In general, the higher the concentration of the phosphorescent phosphor pigment, the brighter is the luminescence and the longer is the afterglow duration. It has been found that as little as 1% by weight of a phosphorescent phosphor pigment such as LumiNova® or Picariko provides visible luminescence, whereas 20% to 30% or more of a conventional sulfide-based phosphor may be required to produce the same amount of luminescence. Because phosphorescent phosphor pigments such as LumiNova® and Picariko are relatively expensive, a balance between the desired luminescence and afterglow duration versus the expense of the article may dictate a smaller concentration than 15% by weight, such as about 5% to about 12% by weight, preferably about 5% to about 10% by weight, and more preferably about 10% by weight.

Although any polymer-soluble dye may be used in the compositions and plastic articles of the invention, the dyes are preferably daylight fluorescent dyes or mixtures of conventional polymer-soluble dyes and daylight fluorescent dyes. The fluorescence of pigments or dyes depends upon their ability to absorb radiant energy at one wavelength, typically shorter than radiation in the visible spectrum, and, after a fleeting instant, emit part of the absorbed energy as a quantum of light of longer wavelength than the absorbed light, in the visible spectrum. This emission is in addition to the normal reflection of light by the colorant, and gives the "extra glow" characteristic of a daylight fluorescent material. At a given wavelength, an article colored with daylight fluorescent colorant material can emit more energy than was received at that wavelength because of the additive effect of energy received at lower wavelengths and emitted at a longer emission wavelength. Daylight fluorescent colorants respond with fluorescence to, for example, daylight, daylight fluorescent light, cool white fluorescent light, and incandescent light.

To obtain the maximum daylight fluorescent effect, it is known to use fluorescent pigments, rather than high cost fluorescent dyes which, like other dyes, are heat unstable and deteriorate upon exposure to ultraviolet light. Fluorescent pigments are manufactured by dissolving fluorescent dyes in brittle transparent resins at low concentrations (about 1%–10% by weight). The colored resins are then ground to powders and used as particulate pigments that are insoluble in the resins to which they are added. The solid solution of the dye in the brittle resin produces reflective color and a fluorescence more brilliant than that of the dye alone. However, as described above, in the phosphorescent compositions and plastic articles of the invention, fluorescent pigments or other colored pigments are not preferred because, by virtue of their particle size, they interfere with the absorption and emission of light by the phosphorescent pigments.

As described above, most dyes are expensive to use and many have poor heat, moisture, and ultraviolet light stability. As such, they are not particularly weatherable and their use is mostly limited to indoor applications. However, the preferred polymer-soluble fluorescent dyes (described below) that are suitable for use in the invention compositions and plastic articles have high heat stability (the ability to withstand molding and extruding temperatures in plastic manufacture), moisture stability, and good ultraviolet light stability, such that they are suitable for both indoor and outdoor use. In addition, the preferred dyes for use in the invention compositions and plastic articles have a high luminosity and high brilliance.

Most preferably, the dyes are highly concentrated (having a high tinctorial strength) and provide strong luminosity and high chroma when incorporated into resins in a very small concentration (e.g., 0.01% to 0.05% by weight of the final part). The amount of dye to be added depends upon the desired intensity of the shade which, in turn, depends on the thickness of the finished plastic part. Mixtures of fluorescent dyes may be used in the invention compositions to provide a wide variety of different colors. Moreover, the fluorescent dye(s) may be mixed with conventional color dyes to produce a palette of colors, including pastels.

The fluorescent dyes preferably have the ability to re-emit absorbed light which can be concentrated to provide "edgeglow" effects. Such edgeglow effects are obtained when fluorescent radiation is transmitted by total internal reflection in a plastic part to the edges, from which it is transmitted in a concentrated form. It has been discovered herein that the daylight fluorescent edgeglow effect in the plastic article is also evident in the luminescent glow in the dark (i.e., the glow is stronger on the edge of the article). Therefore, the plastic articles of this embodiment of the invention provide distance effectiveness and are useful for nighttime markings, such as pavement striping, and the like.

Examples of suitable fluorescent dyes in the embodiments of the invention include Macrolex Fluorescent Yellow 10GN, Fluorescent Yellow FP, and Fluorescent Red G, which are coumarin dyes, available from Bayer; Thermoplast Yellow 084 from BASF, and HOSTASOL® Solvent Yellow 98, Solvent Orange 63, and Vat Red 41, available from Clariant Corporation. The aforementioned polymer-soluble dyes and fluorescent polymer-soluble dyes are comparatively inexpensive, and can be employed economically at high percentage concentrations (e.g., up to about 1% by weight, final part) in the compositions of the invention.

The most preferred fluorescent dyes in the embodiments of the invention are LUMOGEN® F Dyes ("Collector Dyes") manufactured by BASF Corporation. These dyes have light stability in a compatible resin, a strong luminosity, high chroma, and high heat stability, and are weatherable for outdoor use. They are also extremely heat stable, capable of withstanding temperatures of 300° C. or more. The LUMOGEN® dyes are extremely expensive compared to conventional dyes described above, averaging about 30 times the cost per pound. However, these dyes have very high tinctorial strength and are very pure, such that very small amounts (e.g., 0.001% to 0.01% by weight, final part) of the dyes may be employed to produce the same effect as large amounts of the less expensive dyes. For example, the strength of the light energy provided by these dyes, especially due to a strong edgeglow effect, is illustrated by their recommended use for powering small instruments, such as watches, pocket computers, electronic displays, radios, chargers, and the like, by fitting solar cells at the edge of the fluorescent collectors. At present, LUMOGEN® F dyes are available in only four fluorescent colors, Yellow 083 (a perylene dye), Orange 240 (a perylene dye), Red 300 (a perylene dye), and Violet 570 (a naphtalimide dye).

Suitable dyes for mixing with the daylight fluorescent dyes in the compositions of the invention to provide an enlarged palette of daylight colors may be of any type including, but not limited to, methine, pyrazolone, quinophthalone, perinone, anthraquinone, azo, and coumarin type dyes, and the like, known to those skilled in the art. Examples of suitable dyes are Macrolex "solvent" dyes (including granular dyes), such as Yellow 3G, Orange 3G, Red G, Red E2G, Red EG, Red 5B, Violet 3R, Violet B, Blue RR, Green 5B, Green G, and the like, manufactured by Bayer Corporation, Pittsburgh, Pa. Other suitable dyes include polymer-soluble Thermoplast dyes, manufactured by BASF Corporation (Rensselaer, N.Y.), such as Black X70, Yellow 104, Red 454, and Blue 684; "SOLVAPERM®" and "SANDOPLAST®" dyes available from Clariant Corporation, Charlotte, N.C., such as Solvent Orange 60, Solvent Red 135, Solvent Blue 104, Solvent Violet 13, and the like; and AMAPLAST® dyes, such as Solvent Green 3, Solvent Violet 50, Solvent Red 179, and the like, available from Color-Chem International Corporation, Atlanta, Ga.

It is known that polymer-soluble dyes tend to migrate (bleed, bloom) from certain plastics. When selecting the resins for use with particular dyes, and taking into consideration the potential application of plastic compositions and articles, such as for toys or foodstuffs, care must be taken to make a proper selection of a dye-compatible resin. For example, LUMOGEN® F dyes tend to migrate from resins containing butadiene or plasticizers, or from resins that are partially crystalline. However, these dyes can be used in all other transparent and non-transparent crystalline resins, such as styrene acrylonitrile (SAN), general purpose polystyrene (GPS), high impact polystyrene (HIPS), acrylonitrile-butadiene-styrene (ABS), polyethylene terephthalate (PET), polycarbonates, ionomers (e.g., Surlyn® available from DuPont, Wilmington, Del.), and the like.

Manufacturer-recommended resins for use with selected Thermoplast dyes include polycarbonate, polymethyl methacrylate (PMMA), polystyrenes, rigid polyvinyl chloride (RPVC), and SAN. In addition, the fluorescent Yellow 084 is also compatible with styrene-butadiene, ABS, and acrylic styrene acrylonitrile. Macrolex dyestuffs are suitable for use with amorphous thermoplastic resins, such as polystyrenes, styrene-butadiene, SAN, ABS, and their blends, PMMA, polycarbonates, and their blends, rigid PVC, PET, polybutylene terephthalate (PBT), nylon 6, nylon 12, cellulosics, and the like, but are not recommended for crystalline systems, such as high density polyethylene (HDPE), low density polyethylene (LDPE), polypropylene, or thermoplastics containing plasticizers, such as flexible PVC and plasticized cellulosic resins. AMAPLAST® dyes are variously compatible with ABS, acrylics, nylons, PBT, PET polycarbonates, polystyrenes, polysulfones, and the like. Other dyes are compatible with polyester and/or polyamide resins. Thus, it can be seen that the resin compatibility varies with the type of dye, and following the manufacturer's recommendations, one skilled in the art may choose the appropriate resin without undue experimentation.

In addition to the resin, phosphorescent pigment, and dye components of the composition, it may occasionally be desirable to include 0.001% to 2% of a whitening filler/pigment in the composition in order to make the color appear lighter. However, the selected pigment and concentration should not substantially interfere with the desired absorption and emission of light by the phosphorescent pigment or the fluorescent dye for the intended application. A suitable whitening filler for use in the compositions and plastic articles of the invention is zinc sulfide. Because it is a preferred object of the invention to provide substantially clear colored plastic articles, other known whitening pigments, such as titanium dioxide, zinc phosphate, lithopone, and zinc oxide are less preferred in the compositions of the invention.

It may also be desirable, for certain applications, to add 0.001% to 20% by weight of an inert filler, such as calcium carbonate, talc, china clay, to the composition, providing that the filler does not substantially interfere with the absorption and emission of light by the phosphorescent pigment and fluorescent dye for the desired application.

Although some dyes may be supplied in liquid form (e.g., dissolved in an organic solvent), it is more typical that the dyes, phosphorescent pigments, and other desired pigments or fillers are supplied in powder form. The resin may be in powder, granule, flake or pellet form. In some cases, the dye may adhere to the surface of the resin as a result of electrostatic charging and may be uniformly distributed on the resin surface by low-speed or high-speed mixing. However, when extremely small amounts of dyes are used in the composition, it may be advantageous to pre-blend the powdered dye in a dispersing agent, such as a viscous oil, to aid in achieving a homogenous dye dispersion. An exemplary suitable dispersing agent is PARAPLEX®, an epoxidized soybean oil, available from The C. P. Hall Company, Chicago, Ill.

It may also be desirable to add a lubricating agent, such as a wax, to the dry composition, prior to processing, at a concentration of 1% to 10% by weight in the final part. For example, such a lubricating agent may comprise a low molecular weight, substantially transparent polymeric material, such as a silicone wax, a fatty acid, a metallic salt, an ionomer wax, an amide wax, a hydroxy stearate, an olefinic wax, or a mixture of any of the foregoing. An exemplary suitable lubricating agent for use in the compositions of the invention is ADVAWAX® 280, an N,N' ethylene bis(stearamide) wax available from Morton Thiokol, Inc., Carstab Division, Cincinnati, Ohio.

In less preferred embodiments, if dyes (or phosphorescent phosphors) are employed that have poor light fastness, it may be desirable to add small amounts of UV stabilizers to the invention compositions (e.g., benzophenones, benzotriazoles, hindered amine light stabilizers, or the like, or other stabilizers known to those skilled in the art). Alternatively, for some applications, a UV light shielding layer may be formed on the surface of the plastic article to absorb a part of UV light externally incident on the article. Such layers are known to those skilled in the art.

EXAMPLES

The following examples are illustrative of the compositions and plastic articles of the invention. The examples are not intended to be limiting, as other resins, polymer-soluble fluorescent dyes, polymer-soluble dyes, phosphorescent phosphor pigments, lubricating agents, dispersing agents, and other additives may be used in other quantities and combinations by one of ordinary skill in the art, without departing from the scope of the invention.

Examples 1–24

In each of the examples, 227 grams of resin were mixed with 22.7 grams of LumiNova® G-300M Phosphorescent Phosphor pigment, 0.023 grams of the respective polymer-soluble dye. The pigment and dye powders were pre-blended with 10 drops (approximately one gram) of PARAPLEX® G-62 epoxidized soybean oil. ADVAWAX® 280, in an amount of 2.0 grams was added to the mixture, which was then mixed in a Harbil mixer or a paint shaker and injection molded at about 420° F. The concentrations of the resin, dye and phosphorescent pigment are expressed as the percentage of the resin in the final part in Tables 1 through 5.

The resulting daylight color, glow-in-the-dark color are set forth in the Tables. As illustrated, the glow-in-the-dark color is similar to the daylight fluorescent color in every case except in examples 19–24, where red-violet or violet fluorescent dyes were employed. In these cases, the glow-in-the-dark color was whitish, rather than a violet shade.

In each of the examples a bright daylight edgeglow effect and, in addition, a darkness bright edgeglow effect was observed.

Weatherability Tests

To ascertain the light fastness (UV radiation resistance) of plastic articles manufactured from the compositions of the invention, standard accelerated weathering tests were performed on representative samples in the M. A. Hanna Color Technical Center.

Light Fastness of Phosphorescent Pigments

PVC sheet phosphorescent plastics were prepared containing the following:

10% LumiNova® in flexible PVC; or
10% ZnS:Cu,Co in rigid PVC; or
10% ZnS:Cu in rigid PVC; or
10% ZnS:Cu in flexible PVC.

The samples were exposed to 3 MW/cm$^2$ of UV light, using a high pressure mercury lamp for 0 hours to 100 hours and 0 hours to 1000 hours.

The test results illustrated that LumiNova® G-300M phosphorescent phosphor in flexible PVC showed no change in coloration up to the maximum 1000 hours of the test. In contrast, all of the zinc sulfide-type phosphorescent phosphors showed degradation due to exposure to the light. In particular, the zinc sulfide:copper, cobalt phosphorescent phosphor in rigid PVC showed a darkening of the plastic by 400 hours of test exposure. The zinc sulfide:copper activated phosphorescent phosphor in rigid PVC showed pronounced darkening by 10 hours of exposure, that appeared to be maximum darkening at 100 hours. The zinc sulfide:copper activated phosphorescent phosphor in flexible PVC showed less darkening than the same phosphor in rigid PVC; however, significant darkening was apparent by 60 hours.

Light Fastness of Polymer-Soluble Dyes

Samples of soluble dyes were prepared in general purpose styrene (GPS) in the concentrations illustrated in Table 6. The samples were exposed as required by ASTM 2565 to a xenon arc lamp, using the Atlas model Ci65 xenon arc weatherometer. The weatherometer was set up in accordance with the SAE J1960 method (accelerated exposure of automotive interior).

The energy level was 0.55 W/m$^2$ @ 340 nm. The light/dark ratio was 2:1 in the following cycle: 40 min. of light followed by 20 min. of light, sample sprayed with water followed by 60 min. of light, followed by 60 min. of dark with back rack spray with water, and repeating.

The color of each test sample undergoing weathering was compared to an unexposed control sample using a spectrophotometer to determine a color difference (ΔE), by methods known to those skilled in color compounders for providing a measure of the color intensity of pigments and dyes. The methods are set forth by the International Commission on Illumination (CIE). The CIE Lab color differences were reported for the illuminant D65 and a 10 degree observer, using a small area view measurement condition, with a white background, as known to those skilled in the art.

The test samples were weathered to a color difference (ΔE) of 10, or for a minimum of 100 hours, which is the equivalent of solar energy acquired from approximately 0.4 months of outdoor South Florida exposure.

The results of the weatherability testing of representative samples of the invention plastic articles are illustrated in Table 6. Measurements of the ΔE were made at 100 hour intervals. The results illustrate that the weatherability of the fluorescent dyes used in the invention compositions is comparable to the weatherability of other high performance dyes known to those skilled in the art.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 1

| Example No. | 1 | 2 | 3 | 4 |
|---|---|---|---|---|
| Resin (%)* | | | | |
| HDPE or PPRO** | 100 | 100 | 100 | 100 |
| Phosphor (%) | | | | |
| LumiNova ® G-300 | 10 | 10 | 10 | 10 |
| Fluorescent Dye (%)*† | | | | |
| Lumogen ® Yellow 083 | 0.01 | | | |
| Lumogen ® Orange 240 | | 0.01 | | |
| Lumogen Red ® 300 | | | 0.01 | |
| Lumogen ® Violet 570 | | | | 0.01 |
| Daylight Color: | clear‡ fluorescent yellow | clear fluorescent orange | clear fluorescent pinkish red | clear greenish white |
| Glow-in-the-Dark Color: | clear‡ bright yellow-green | clear bright yellow | clear bright pink | clear bright green |
| Daylight Edgeglow Effect: | yes | yes | yes | yes |
| Darkness Edgeglow Effect: | yes | yes | yes | yes |

*All percentages are expressed in terms of the final plastic material.
**HDPE = high density polyethylene; PPRO = polypropylene.
†BASF LUMOGEN ® F Dyes.
‡"Clear" means almost transparent; newsprint can be clearly read through the part.

TABLE 2

| Example No. | 5 | 6 | 7 | 8 |
|---|---|---|---|---|
| Resin (%)* | | | | |
| GPS** | 100 | 100 | 100 | 100 |
| Phosphor (%)* | | | | |
| LumiNova ® G-300 | 10 | 10 | 10 | 10 |
| Fluorescent Dye (%)*† | | | | |
| LUMOGEN ® Red 300 | 0.01 | 0.005 | | |
| LUMOGEN ® Orange 240 | | | 0.01 | 0.005 |
| Daylight Color: | clear‡ fluorescent pinkish red | clear fluorescent pinkish red | clear fluorescent yellowish orange | clear fluorescent yellow |
| Glow-in-the-Dark Color: | clear‡ bright pink | clear light pink | clear bright yellow | clear bright greenish yellow |
| Daylight Edgeglow Effect: | yes | yes | yes | yes |
| Darkness Edgeglow Effect: | yes | yes | yes | yes |

*All percentages are expressed in terms of the final plastic material.
**GPS = general purpose polystyrene
†BASF LUMOGEN ® F Dyes.
‡"Clear" means almost transparent; newsprint can be clearly read through the part.

TABLE 3

| Example No. | 9 | 10 | 11 | 12 | 13 | 14 |
|---|---|---|---|---|---|---|
| Resin (%)* | | | | | | |
| GPS* | 100 | 100 | 100 | 100 | 100 | 100 |
| Phosphor (%)* | | | | | | |
| LumiNova ® G-300 | 10 | 10 | 10 | 10 | 10 | 10 |
| Fluorescent Dye (%)*† | | | | | | |
| Solvent Orange 63 | 0.01 | 0.005 | | | | |
| Solvent Yellow 98 | | | 0.01 | 0.005 | | |
| Vat Red 41 | | | | | 0.01 | 0.005 |
| Daylight Color: | clear‡ fluorescent orange | clear fluorescent orange | clear fluorescent greenish yellow | clear fluorescent greenish yellow | clear fluorescent pinkish red | clear fluorescent pinkish red |
| Glow-in-the-Dark Color: | clear‡ bright orange | clear bright yellow | clear bright green | clear bright green | clear bright pink | clear light pink |
| Daylight Edgeglow Effect: | yes | yes | yes | yes | yes | yes |
| Darkness Edgeglow Effect: | yes | yes | yes | yes | yes | yes |

*All percentages are expressed in terms of the final plastic material.
**GPS = general purpose polystyrene
†Clariant HOSTASOL ® Fluorescent Dyes.
‡"Clear" means almost transparent; newsprint can be clearly read through the part.

TABLE 4

| Example No. | 15 | 16 |
|---|---|---|
| Resin (%)* | | |
| Surlyn ionomer | 100 | 100 |
| Phosphor (%)* | | |
| LumiNova ® G-300 | 10 | 10 |
| Fluorescent Dye (%)*† | | |
| Solvent Orange 63 | 0.01 | |
| Solvent Yellow 98 | | 0.01 |
| Daylight Color: | slightly opaque fluorescent orange | slightly opaque fluorescent greenish-yellow |
| Glow-in-the-Dark Color: | slightly opaque bright orange | slightly opaque bright green |
| Daylight Edgeglow Effect: | yes | yes |
| Darkness Edgeglow Effect: | yes | yes |

*All percentages are expressed in terms of the final plastic material.
†Clariant HOSTASOL ® Fluorescent Dyes.
‡"Slightly opaque" means newsprint can be seen but not clearly read through the part.

TABLE 5

| Example No. | 18 | 19 | 20 | 21 | 22 | 23 | 24 | |
|---|---|---|---|---|---|---|---|---|
| Resin (%)* | | | | | | | | |
| GPS* | 100 | 100 | 100 | 100 | 100 | 100 | 100 | 100 |
| Phosphor (%)* | | | | | | | | |
| LumiNova ® G-300 | 10 | 10 | 10 | 10 | 10 | 10 | 10 | 10 |
| Fluorescent Dye (%)*† | | | | | | | | |
| Macrolex Green G | 0.01 | | | | | | | |
| Macrolex Green 5B | | 0.01 | | | | | | |
| Macrolex Red Violet R | | | 0.01 | | | | | |
| Macrolex Red 5B | | | | 0.01 | | | | |
| Macrolex Violet B | | | | | 0.01 | | | |
| Carbazole Violet | | | | | | 0.001 | | |
| Carbazole Violet | | | | | | | 0.002 | |
| Carbazole Violet | | | | | | | | 0.004 |
| Daylight Color: | clear‡ dark green | clear blue-green | clear reddish purple | clear reddish purple | clear dark purple | clear violet | clear violet | clear darker violet |
| Glow-in-the-Dark Color: | clear‡ green | clear green | clear grayish white | clear grayish white | clear light green | clear almost white | clear almost white | clear almost white |
| Daylight Edgeglow Effect: | yes | yes | yes | yes | yes | yes | yes | yes |
| Darkness Edgeglow Effect: | yes | yes | yes | yes | yes | yes | yes | yes |

*All percentages are expressed in terms of the final plastic material.
**GPS = general purpose polystyrene
†Bayer Macrolex dyestuffs.
‡"Clear" means almost transparent; newsprint can be clearly read through the part.

TABLE 6

Weatherability Testing of Dyes

| | Colorfastness - Hours of Test Exposure | Equivalent Outdoor Florida Exposure | ΔE |
|---|---|---|---|
| Resin: GPS | | | |
| Polymer-Soluble Dye (%): | | | |
| 0.01% Red 5B** | 100 hours | 0.4 months | 40.42 |
| 0.01% Red 5BP | 100 hours | 0.4 months | 39.91 |
| 0.01% Violet 570* | 200 hours | 0.8 months | 8.47; 16.35 |
| 0.01% Yellow 3R | 200 hours | 0.8 months | 5.85; 10.47 |
| 0.01% Red F300* | 200 hours | 0.8 months | 7.42; 13.12 |
| 0.01% Yellow 083* | 200 hours | 0.8 months | 7.72; 13.27 |
| 0.01% Blue RO | 200 hours | 0.8 months | 5.49; 10.19 |
| 0.01% Red G** | 300 hours | 1.2 months | 4.23; 7.31; 11.09 |
| 0.01% Orange 2G | 300 hours | 1.2 months | 3.51; 7.21; 12.32 |
| 0.01% Blue RR | 300 hours | 1.2 months | 6.03; 9.13; 12.48 |
| 0.01% Yellow 084** | 300 hours | 1.2 months | 6.34; 9.57; 12.27 |
| 0.01% Orange 240* | 400 hours | 1.6 months | 3.84; 6.33; 8.04; 10.06 |
| 0.02% Violet 570* plus 0.001% Phthalo Blue† | 700 hours | 2.8 months | 3.08; 4.11; 5.17; 5.43; 7.15; 9.38; 12.68 |

*Lumogen Fluorescent Dye
**Other Fluorescent Dye
†K6911 - BASF Colorants, Parsippany, NJ

We claim:

1. A composition suitable for forming an entire molded, extruded or formed phosphorescent plastic article having a daylight fluorescent color and a colored luminescent glow-in-the-dark, the composition consisting essentially of:
   (a) 85% to 99% by weight of a transparent or translucent thermoplastic resin;
   (b) 1% to 15% by weight of a non-radioactive, non-sulfide phosphorescent phosphor pigment that emits light in the visible spectrum, dispersed throughout the resin; and
   (c) 0.001% to 1% by weight of at least one heat-stable polymer-soluble daylight fluorescent dye in solid solution with the phosphorescent phosphor pigment in the resin.

2. The composition of claim 1, wherein the phosphorescent phosphor comprises a metal oxide aluminate activated by europium and at least one co-activator, selected from the group consisting of dysprosium, lanthanum, cerium praseodymium, neodymium, samarium, gadolinium, holmium, erbium, thulium, ytterbium, lutetium, tin, manganese, and bismuth, wherein the metal is selected from one or more of strontium, calcium, magnesium, and barium.

3. The composition of claim 2, wherein the phosphorescent phosphor pigment comprises strontium oxide aluminate:dysprosium, europium.

4. The composition of claim 1, further comprising a polymer-soluble non-fluorescent dye.

5. The composition of claim 1, wherein the polymer-soluble fluorescent dye is resistant to moisture and ultraviolet light.

6. The composition of claim 1, containing about 5% to 12% by weight of the phosphorescent pigment.

7. The composition of claim 6, containing about 10% by weight of the phosphorescent pigment.

8. The composition of claim 1, containing 0.005% to 0.5% by weight of the polymer-soluble fluorescent dye.

9. The composition of claim 8, containing 0.005% to 0.05% by weight of the polymer-soluble fluorescent dye.

10. The composition of claim 9, containing about 0.005% to 0.01% by weight of the polymer-soluble fluorescent dye.

11. The composition of claim 1, further containing 1% to 10% of a lubricant selected from the group consisting essentially of silicone waxes, fatty acids, metallic salts, ionomer waxes, amide waxes, hydroxy stearates, olefinic waxes, polyethylene waxes, polypropylene waxes, and mixtures thereof.

12. The composition of claim 1, further containing 0.01% to 1% of a dispersing agent for the polymer-soluble dye.

13. The composition of claim 12, wherein the dispersing agent comprises an oil.

14. The composition of claim 1, further comprising 0.001% to 2% of a whitening pigment.

15. The composition of claim 14 wherein the whitening pigment is zinc sulfide.

16. The composition of claim 1, further comprising 0.001% to 20% of an inert filler.

17. The composition of claim 16, wherein the inert filler is selected from calcium carbonate, talc, china clay, and mixtures thereof.

18. A molded, extruded or formed phosphorescent plastic article having a daylight fluorescent color and a colored luminescent glow in the dark, consisting essentially of a composition that consists essentially of (a) 85% to 99% by weight of a transparent or translucent thermoplastic resin; (b) 1% to 15% by weight of a non-radioactive, non-sulfide phosphorescent phosphor pigment that emits light in the visible spectrum, dispersed throughout the resin; and (c) 0.001% to 1% by weight of at least one heat-stable polymer-soluble daylight fluorescent dye in solid solution with the phosphorescent phosphor pigment in the resin.

19. The article of claim 18, wherein the daylight fluorescent color and the color of the luminescent glow in the dark are similar.

20. The article of claim 19, wherein the daylight color and the color of the luminescent glow in the dark are different from the color of a natural luminescence of the phosphorescent phosphor.

21. The article of claim 18, wherein the color of the luminescent glow in the dark is different from both the daylight color and the color of a natural luminescence of the phosphorescent phosphor.

22. The article of claim 18, wherein the phosphorescent phosphor comprises a metal oxide aluminate activated by europium and at least one co-activator, selected from the group consisting of dysprosium, lanthanum, cerium praseodymium, neodymium, samarium, gadolinium, holmium, erbium, thulium, ytterbium, lutetium, tin, manganese, and bismuth, wherein the metal is selected from one or more of strontium, calcium, magnesium, and barium.

23. The article of claim 22, wherein the phosphorescent phosphor pigment comprises strontium oxide aluminate:dysprosium, europium.

* * * * *